United States Patent [19]

Fujimori

[11] 4,418,797

[45] Dec. 6, 1983

[54] SLIDING CALIPER DISC BRAKES

[75] Inventor: Fumio Fujimori, Anjo, Japan

[73] Assignee: Aisin Seiki Kabushiki Kaisha, Kariya, Japan

[21] Appl. No.: 274,887

[22] Filed: Jun. 18, 1981

[30] Foreign Application Priority Data

Jun. 26, 1980 [JP] Japan ................................ 55-88084

[51] Int. Cl.³ ............................................ F16D 65/02
[52] U.S. Cl. ............................ 188/73.37; 188/73.45
[58] Field of Search ............... 188/72.1, 73.31, 73.39, 188/73.41, 73.42, 73.45, 73.47, 250 G, 73.36, 73.37

[56] References Cited

U.S. PATENT DOCUMENTS

| | | | |
|---|---|---|---|
| 4,034,857 | 7/1977 | Kondo et al. | 188/73.45 X |
| 4,055,238 | 10/1977 | Haraikawa et al. | 188/73.37 |
| 4,106,595 | 8/1978 | Kimura et al. | |
| 4,144,952 | 3/1979 | Nakayama | 188/73.3 |
| 4,345,675 | 8/1982 | Ritsema | 188/73.45 X |

FOREIGN PATENT DOCUMENTS

| | | |
|---|---|---|
| 2558141 | 7/1976 | Fed. Rep. of Germany ... 188/73.45 |
| 1427245 | 3/1976 | United Kingdom . |
| 1527844 | 10/1976 | United Kingdom . |
| 1546727 | 5/1979 | United Kingdom . |
| 1548220 | 7/1979 | United Kingdom . |
| 2016099 | 9/1979 | United Kingdom ............ 188/73.45 |
| 2028940 | 3/1980 | United Kingdom . |
| 2049846 | 12/1980 | United Kingdom . |
| 2058969 | 4/1981 | United Kingdom . |

*Primary Examiner*—Duane A. Reger
*Attorney, Agent, or Firm*—Oblon, Fisher, Spivak, McClelland & Maier

[57] ABSTRACT

In a disc brake such as a sliding caliper disc brake, the caliper is slidably mounted for movement with respect to a torque plate by first and second sliding connections. The first connection is provided by a pair of parallel pins axially secured to the torque plate and lugs integral with the caliper member and engaging over the pins while the second connection is provided by extension portions of the pins and apertures engaging the extension portions in a backing plate of a pad assembly fast on a lim portion of the caliper. The construction is such that a resulting span from combining the first and second sliding connections is longer than is obtained by the conventional sliding connections which are usually provided by a pair of pins and lugs engaging the pins. The longer span of sliding connections of the invention is effective to prevent the caliper member from being rotated around an imaginary axis normal to the axis of the friction disc.

4 Claims, 2 Drawing Figures

SLIDING CALIPER DISC BRAKES

BACKGROUND OF THE INVENTION

1. Field of the Invention

This invention relates to sliding caliper disc brakes.

2. Description of the Prior Art

In disc brakes of the type having a caliper member mounted on a torque plate member by means of a pair of sliding connections on a pair of parallel pins, the caliper tends to rotate or rattle through an angle around an imaginary axis perpendicular to the sliding direction of the sliding connections leading possibly to different resistance to that sliding, ruin of protecting rubber boots, rattle and noise.

Attempts to avoid such defects by increase of a span of the sliding fit connection have proven to be disadvantage resulting from increase of weight of the disc brake.

SUMMARY OF THE INVENTION

It is an object of the present invention to provide a sliding caliper disc brake having an additional sliding connection other than and axially apart from those on the conventional pins.

According to the present invention, there is provided a sliding caliper disc brake comprising a rotatable disc, a torque plate member for fixing to a vehicle frame or the like, a caliper member straddling a minor portion of the periphery of the disc for moving friction pad means disposed on opposite sides of the disc into braking engagement with the disc, a portion of the torque plate member being arranged to receive directly a drag force experienced by one of the pad means, motor means in the caliper member for directly urging the said one of the pad means onto one side of the disc to cause the caliper member to slide relative to the torque plate member to apply by reaction the opposite pad means to the other side of the disc, a first sliding connection between the caliper member and the torque plate member comprising a pair of parallel pin means of one of members and a pair of corresponding openings in the other of the members receiving the pin means respectively therein as a sliding fit, a second sliding connection between the members comprising a pair of apertures in the said other pad assembly, extension portions of said pin means received in the said apertures as a sliding fit, and a connection between the caliper member and the said other pad assembly comprising a second pin means protruding from one thereamong, corresponding aperture in the other one receiving the second pin therethrough and a bushing of elastic material being provided on the second pin means to ensure a close fitting of the second pin in the aperture.

When the disc brake is installed, the second sliding connection effects an increase of an entire span of a combined sliding connection between the caliper member and the torque plate member so that the caliper member is relieved of rotational movement around an axis normal to the sliding connection, as would otherwise resist against the sliding connection.

BRIEF DESCRIPTION OF THE DRAWINGS

The invention will be described further, by way of example, with reference to the accompanying drawings, in which.

DESCRIPTION OF THE PREFERRED EMBODIMENT

Figure 1:
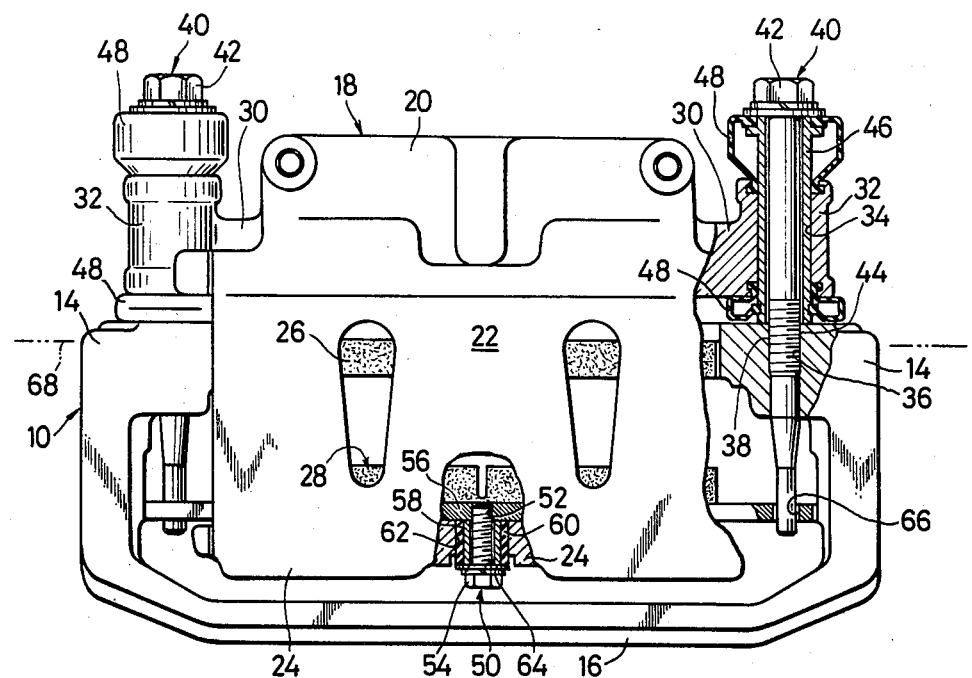
FIG. 1 is a plan view, partly in section, of a sliding caliper disc brake embodying the invention.
Figure 2:
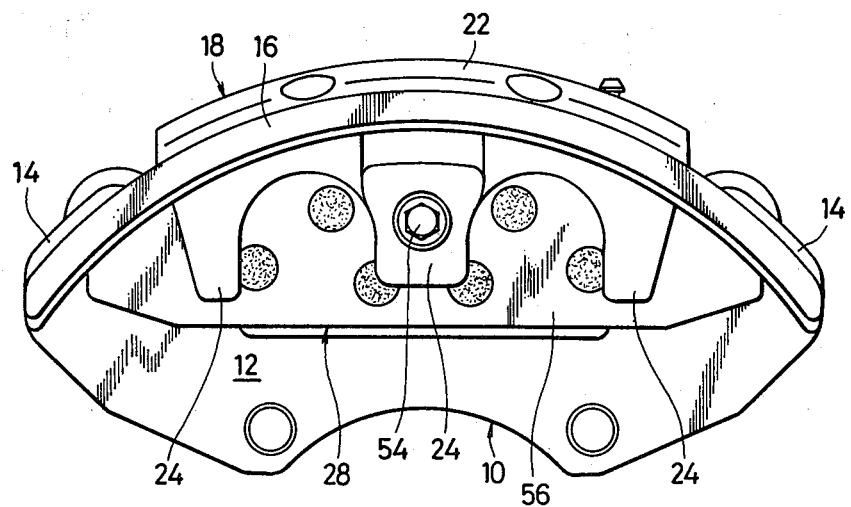
FIG. 2 is a front elevation of the brake.

In the sliding caliper disc brake illustrated in FIGS. 1 and 2, a torque plate generally designated 10 has a main radially directed portion 12 extending on one side of a brake disc (not shown), the main torque plate portion 12 being bifurcated to present a pair of lateral arms 14 situated at respective circumferential end regions of the torque plate. The arms 14 are integrally connected with each other as shown in FIG. 2 by an arcuated bridge portion 16 which provides means for increasing rigidity of the torque member 10 against the braking torque. A generally U-shaped caliper member 18 has a radially directed rear limb 20 connected by an axial crown portion 22 to a radially directed front three limbs 24 (FIG. 2).

The crown portion 22 of the caliper member 18 passes through the opening defined between the arms 14. The caliper 18 is formed with a fluid pressure actuator such as a cylinder-and-piston assembly of a conventional type (not shown) in the rear limb 20. The piston is in contact engagement with a friction pad assembly 26 (FIG. 1) and responsive to fluid pressure within the cylinder in order directly to displace the pad assembly 26 (FIG. 1) into engagement with the brake disc (not shown). The pad assembly 26 has a sliding fit on the arms 14 at its circumferential end regions, which is considered unnecessary to be described in greater detail since such construction does not form the invention.

By virtue of the reaction resulting from engagement of the friction pad assembly 26 with the brake disc, the caliper member 18 is caused to slide relatively to the torque plate 10, thereby to engage the friction pad assembly 28 with the opposite face of the brake disc.

For the purpose of establishing the required sliding connection between the torque plate 10 and the caliper member 18, the latter is provided with circumferential extensions 30, each of which terminates in an axially directed lug 32. The lugs 32 are axially apertured as indicated at 34 and the apertures 34 are intended each to register axially with a corresponding axial aperture 36 formed in an adjacent torque plate arm 14. Each torque plate aperture 36 receives the shank portion 38 of a pin 40 which is passed through it and which extends beyond it on the side opposite to the head 42 of the pin 40. The shank portion 38 is partially threaded as shown at 44 and engages an internally threaded region of the apertures 36 of the arm 14. Each lug 32 is engaged in sliding relation over a bush 46 which is clamped between the head 42 of the pin 40 and a side face portion of the arm 14. The aperture of the bush 46 is oversize, so that the pin 40 is received as a free fit, and the bush is clamped in the oversize aperture by interengagement of screw threaded portions between the head 42 and the arm 14. Protective rubber or plastics boots 48 are engaged over the bush 46 and each end of the lug 32 in which it is received in order to exclude dirt and moisture and to retain the bush in the lug 32.

The important feature of the invention is that the middle front limb 24 has a pin 50 which is threaded at its extremity end portion and engages an internally threaded bore 52 of a backing plate 56 of the friction pad assembly 28 as shown in FIG. 1. Between the head 54 and the backing plate 56 of the friction pad assembly 28 is a bush 58 which is oversize so that the pin 50 is received as a free fit and the pin 50 is clamped in the oversize bushing by interengagement of screw threaded portions. Over the bushing 58 is engaged further a rubber or other elastic material bushing 60 over which a bore 62 of the limb portion 24 is engaged in fitting relation. A spring washer 64 is provided for preventing the pin 50 from being loosened and the bushings 58 and 60 from falling off.

The backing plate 56 of the friction pad assembly 28 has a pair of apertures 66 in which are received the extension portions of the pins 40 as a free sliding fit.

The construction is such that the caliper member 18 is relieved of any tendency of rotation around an axis shown at 68 in FIG. 1 when the vehicle is travelling, with the result that there exists no possibility of the conventionally experienced defects such as resistance against the sliding movement of the caliper member 18 on the pins 40, ruin of the boots 48 due to rattle of the caliper member, and noise due to the rattle.

The above mentioned advantages may be attributed to a substantial enlargement of the span resulting from combining the first and second sliding connections between the caliper member and the torque plate member. The first sliding connection is provided by the lugs and the bushes 46 while the second sliding connection is provided by the pins 40 and the apertures 66 of the backing plate 56.

What is claimed is as follows:

1. A sliding caliper disc brake comprising:
   a rotatable disc;
   a torque plate member fixed to a body of a vehicle;
   a caliper member straddling a minor portion of said rotatable disc and slidably carried on said torque plate member, said caliper member having fluid actuated means for urging an inner pad means onto one side of said disc by direct contact therewith and for urging an outer pad means onto the other side of said disc by movement of said caliper relative to said torque plate member, said inner and outer pad means being disposed in slidable direct torque transmitting contact with said torque plate member; and
   connection means for connecting said outer pad means to said caliper member, said connection means comprising an aperture in said torque plate member, a bolt threaded into said outer pad means and passing through said aperture of said torque plate member, and an elastic bushing disposed between said bolt and said torque plate member in said aperture to ensure a close fitting of the bolt in the aperture and to absorb vibration.

2. The sliding caliper of claim 1 including:
   at least one second aperture in a backing plate of said outer pad means;
   at least one third aperture in said caliper member; and
   a pin fixed in said torque plate member for each said second and third aperture, each said pin being slidably fitted in one said second aperture in sliding contact with said backing plate and being slidably fitted in one said third aperture;
   wherein said caliper member is slidably carried on said torque plate member by said slidable fitting of each said pin in one said third aperture, and wherein said caliper is slidably guided by said sliding contact between said at least one pin and said outer pad means.

3. The sliding caliper of claim 1 wherein said at least one second and third apertures and said pin for each said second and third apertures comprise one of said second and third apertures and one said pin at each circumferential end of said caliper.

4. The sliding caliper of claim 1 including a metallic bushing disposed between said bolt and said elastic bushing.

* * * * *